(12) United States Patent
Tomita

(10) Patent No.: US 12,646,805 B2
(45) Date of Patent: Jun. 2, 2026

(54) NON-AQUEOUS ELECTROLYTE SECONDARY BATTERY

(71) Applicant: TOYOTA JIDOSHA KABUSHIKI KAISHA, Toyota (JP)

(72) Inventor: Masataka Tomita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 18/178,609

(22) Filed: Mar. 6, 2023

(65) Prior Publication Data

US 2023/0318143 A1     Oct. 5, 2023

(30) Foreign Application Priority Data

Apr. 4, 2022     (JP) ................................. 2022-062358

(51) Int. Cl.
| | |
|---|---|
| *H01M 50/46* | (2021.01) |
| *H01M 50/411* | (2021.01) |
| *H01M 50/431* | (2021.01) |
| *H01M 50/443* | (2021.01) |
| *H01M 50/446* | (2021.01) |
| *H01M 50/449* | (2021.01) |
| *H01M 50/457* | (2021.01) |
| *H01M 50/489* | (2021.01) |

(52) U.S. Cl.
CPC ....... *H01M 50/461* (2021.01); *H01M 50/411* (2021.01); *H01M 50/431* (2021.01); *H01M 50/443* (2021.01); *H01M 50/446* (2021.01);

*H01M 50/449* (2021.01); *H01M 50/457* (2021.01); *H01M 50/489* (2021.01)

(58) Field of Classification Search
CPC ............. H01M 50/461; H01M 50/489; H01M 50/457; H01M 50/446; H01M 50/443; H01M 50/449; H01M 50/431; H01M 50/411
See application file for complete search history.

(56) References Cited

U.S. PATENT DOCUMENTS

| | | | |
|---|---|---|---|
| 2004/0053122 A1 | 3/2004 | Sugiyama et al. | |
| 2017/0338459 A1 | 11/2017 | Nakahiro et al. | |
| 2019/0044118 A1 | 2/2019 | Sakurai et al. | |
| 2023/0178751 A1 | 6/2023 | Ogihara et al. | |

FOREIGN PATENT DOCUMENTS

| | | |
|---|---|---|
| CN | 114024098 A | 2/2022 |
| JP | 2004146190 A | 5/2004 |
| JP | 2019029315 A | 2/2019 |
| WO | 2016/098684 A1 | 6/2016 |
| WO | 2021/200083 A1 | 10/2021 |

*Primary Examiner* — James Lee
(74) *Attorney, Agent, or Firm* — Dickinson Wright, PLLC

(57)     ABSTRACT

A non-aqueous electrolyte secondary battery includes a positive electrode, a negative electrode, a separator, and a non-aqueous electrolyte, wherein the separator includes a first surface facing the positive electrode and a second surface facing the negative electrode, an adhesive layer is formed on the second surface or each of the first surface and the second surface, the adhesive layer includes inorganic particles and an organic binder, and a ratio of a peeling strength between the separator and the adhesive layer to a peeling strength between the negative electrode and the adhesive layer is more than 0 and 4.0 or less.

4 Claims, 1 Drawing Sheet

NON-AQUEOUS ELECTROLYTE SECONDARY BATTERY

This nonprovisional application is based on Japanese Patent Application No. 2022-062358 filed on Apr. 4, 2022 with the Japan Patent Office, the entire contents of which are hereby incorporated by reference.

BACKGROUND

Field

The present disclosure relates to a non-aqueous electrolyte secondary battery.

DESCRIPTION OF THE BACKGROUND ART

Japanese Patent Laying-Open No. 2004-146190 discloses a lithium ion secondary battery having an adhesive layer between a separator and an electrode.

SUMMARY

Since the lithium ion secondary battery disclosed in Japanese Patent Laying-Open No. 2004-146190 has the adhesive layer, adhesion is excellent between the separator and the electrode, but heat shrinkage resistance is low. That is, when the temperature of the battery is increased to shrink the separator, the adhesive layer may be peeled off from the electrode to bring the positive electrode and the negative electrode into direct contact with each other, thus resulting in short circuit. Thus, there is room for improvement from the viewpoint of safety.

Accordingly, it is an object of the present disclosure to provide a non-aqueous electrolyte secondary battery excellent in safety.

[1] The present disclosure is directed to a non-aqueous electrolyte secondary battery including a positive electrode, a negative electrode, a separator, and a non-aqueous electrolyte, wherein the separator includes a first surface facing the positive electrode and a second surface facing the negative electrode, an adhesive layer is formed on the second surface or each of the first surface and the second surface, the adhesive layer includes inorganic particles and an organic binder, and a ratio of a peeling strength between the separator and the adhesive layer to a peeling strength between the negative electrode and the adhesive layer is more than 0 and 4.0 or less.

The adhesive layer of the present disclosure includes the inorganic particles and the organic binder. Since the adhesive layer includes the inorganic particles, heat resistance of the separator is improved. The organic binder included in the adhesive layer binds the inorganic particles together, and also binds a substrate of the separator and the adhesive layer together. Since the adhesive layer having such a configuration is provided on the surface of the separator facing the negative electrode or each of the both surfaces of the separator, even when the separator is shrunk due to an increase in battery temperature, a portion of the adhesive layer remains on the surface of the negative electrode to suppress direct contact between the negative electrode and the positive electrode. As a result, short circuit is prevented to improve safety.

[2] The peeling strength between the negative electrode and the adhesive layer is preferably 8.0 N/m or less.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described below. It should be noted that the present disclosure is not limited thereto.

Non-Aqueous Electrolyte Secondary Battery

Figure 1:
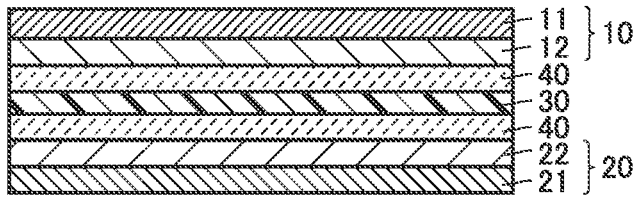
FIG. 1 is a schematic cross sectional view showing an exemplary layer structure of an electrode assembly included in a non-aqueous electrolyte secondary battery of the present embodiment.

FIG. 1 is a schematic cross sectional view showing an exemplary layer structure of an electrode assembly included in a non-aqueous electrolyte secondary battery (hereinafter, simply referred to as "battery") of the present embodiment. The battery of the present embodiment includes an exterior package (not shown), an electrode assembly 50 and a non-aqueous electrolyte (not shown). The exterior package may be, for example, a pouch composed of an aluminum laminate film, or the like. Electrode assembly 50 includes a positive electrode 10, a separator 30, and a negative electrode 20. Separator 30 includes a first surface facing positive electrode 10 and a second surface facing negative electrode 20. An adhesive layer 40 is formed on the second surface or each of the first surface and the second surface.

Electrode assembly 50 is, for example, a stacked type. Electrode assembly 50 is formed by stacking positive electrode 10, separator 30, and negative electrode 20. Electrode assembly 50 can have any stacking structure as long as it includes one or more positive electrodes 10, one or more separators 30, and one or more negative electrodes 20. For example, electrode assembly 50 may be formed by stacking positive electrode 10, separator 30, negative electrode 20, separator 30, and positive electrode 10 in this order.

Electrode assembly 50 is, for example, a wound type. Electrode assembly 50 includes positive electrode 10, separator 30, and negative electrode 20. Each of positive electrode 10, separator 30, and negative electrode 20 is a sheet in the form of a strip. Positive electrode 10, separator 30, and negative electrode 20 are stacked and spirally wound to form electrode assembly 50. After the winding, electrode assembly 50 may be shaped to be flat.

Positive Electrode

Positive electrode 10 is connected to a positive electrode terminal (not shown). Positive electrode 10 includes a positive electrode current collecting foil 11 and a positive electrode composite material 12. Positive electrode current collecting foil 11 may be, for example, an aluminum (Al) foil or the like. Positive electrode current collecting foil 11 may have a thickness of, for example, 10 μm or more and 30 μm or less.

Positive electrode composite material 12 may have a thickness of, for example, 10 μm or more and 200 μm or less. Positive electrode composite material 12 includes at least a positive electrode active material. Positive electrode composite material 12 may consist essentially of the positive electrode active material, for example. Positive electrode composite material 12 may include, for example, a conductive material, a binder, and the like in addition to the positive electrode active material. The positive electrode active material may include, for example, at least one selected from a group consisting of lithium cobaltate, lithium nickelate, lithium manganate, lithium nickel cobalt manganate (for example, $LiNi_{1/3}Co_{1/3}Mn_{1/3}O_2$ or the like), lithium nickel cobalt aluminate, and lithium iron phosphate. The positive electrode active material may be subjected to surface treatment. A buffer layer may be formed on a surface of the positive electrode active material by the surface treatment. The buffer layer may include lithium niobate ($LiNbO_3$) or the like, for example. The conductive material may include a carbon material such as carbon black (CB), acetylene black (AB), Ketjen black, graphite, or the like, for example. The binder may include, for example, polyvinylidene difluoride (PVdF), polytetrafluoroethylene (PTFE), polyacrylic acid (PAA), or the like.

(Negative Electrode)

Negative electrode 20 is connected to a negative electrode terminal (not shown). Negative electrode 20 includes a negative electrode current collecting foil 21 and a negative electrode composite material 22. Negative electrode current collecting foil 21 may be, for example, a copper (Cu) foil, a nickel (Ni) foil, or the like. Negative electrode current collecting foil 21 may have a thickness of, for example, 5 μm or more and 30 μm or less.

Negative electrode composite material 22 may have a thickness of, for example, 10 μm or more and 200 μm or less. Negative electrode composite material 22 includes at least a negative electrode active material. Negative electrode composite material 22 may consist essentially of a negative electrode active material, for example. Negative electrode composite material 22 may include, for example, a conductive material, a binder, and the like in addition to the negative electrode active material. The negative electrode active material may include, for example, at least one selected from a group consisting of graphite, soft carbon, hard carbon, silicon, silicon oxide, a silicon-based alloy, tin, tin oxide, a tin-based alloy, and lithium titanate ($Li_4Ti_5O_{12}$). The conductive material may include a carbon material such as carbon black (CB), acetylene black (AB), Ketjen black, graphite, or the like, for example. The binder may include, for example, polyvinylidene difluoride (PVdF), polytetrafluoroethylene (PTFE), polyacrylic acid (PAA), styrene-butadiene rubber (SBR), carboxymethyl cellulose (CMC), and the like.

(Separator)

Separator 30 is interposed between positive electrode 10 and negative electrode 20. Separator 30 spatially separates positive electrode 10 and negative electrode 20 from each other. Separator 30 blocks electron conduction between positive electrode 10 and negative electrode 20. Separator 30 is porous. Separator 30 may be composed of polyolefin, for example. Separator 30 may have, for example, a singlelayer structure. Separator 30 may consist of a polyethylene (PE) layer, for example. Separator 30 may have, for example, a multilayer structure. Separator 30 may have, for example, a three-layer structure. Separator 30 may include, for example, a polypropylene (PP) layer, a PE layer, and a PP layer. The PP layer, the PE layer, and the PP layer may be stacked in this order. Separator 30 may have a thickness of 5 μm or more and 40 μm or less, for example. Separator 30 may have a porosity of 30% or more and 60% or less, for example.

Separator 30 includes the first surface facing positive electrode 10 and the second surface facing negative electrode 20. Adhesive layer 40 is formed on the second surface or each of the first surface and the second surface. Adhesive layer 40 may be formed on at least the second surface, and is preferably formed on each of the first surface and the second surface. Adhesive layer 40 may have a thickness of 1 μm or more and 6 μm or less, for example. Adhesive layer 40 includes inorganic particles and an organic binder.

(Inorganic Particles)

The inorganic particles are not particularly limited, but are preferably inorganic particles excellent in heat resistance and electrochemical stability. Examples of the inorganic particles include an aluminum compound, a magnesium compound, and other compounds. Examples of the aluminum compound include aluminum oxide, aluminum silicate, aluminum hydroxide, aluminum hydroxide oxide, sodium aluminate, aluminum sulfate, aluminum phosphate, hydrotalcite, and the like. Examples of the magnesium compound include magnesium sulfate, magnesium hydroxide, and the like. Examples of the other compounds include an oxide-based ceramic, a nitride-based ceramic, a clay mineral, silicon carbide, calcium carbonate, barium titanate, asbestos, zeolite, calcium silicate, magnesium silicate, diatomaceous earth, silica sand, a glass fiber, and the like. Examples of the oxide-based ceramic include silica, titania, zirconia, magnesia, ceria, yttria, zinc oxide, iron oxide, and the like. Examples of the nitride-based ceramic include silicon nitride, titanium nitride, boron nitride, and the like. Examples of the clay mineral include talc, montmorillonite, sericite, mica, amesite, bentonite, and the like. One type of inorganic particles may be used solely, or two or more types of inorganic particles may be used in combination.

As the inorganic particles, aluminum oxide, aluminum hydroxide oxide, and aluminum silicate are preferable from the viewpoint of heat resistance and electrochemical stability. Examples of the aluminum oxide include alumina. Examples of the aluminum hydroxide oxide include boehmite. Examples of the aluminum silicate include kaolinite, dickite, nacrite, halloysite, and pyrophyllite. Among them, aluminum hydroxide oxide is more preferable. This is because internal short circuit resulting from generation of lithium dendrite can be prevented, heat shrinkage at high temperature is suppressed, and excellent heat resistance is attained.

The inorganic particles may have a D50 of 0.2 μm or more and 3 μm or less, for example. In the present specification, "D50" is defined as a particle diameter corresponding to a cumulative frequency of 50% from the smallest particle diameter in a volume-based particle size distribution. The volume-based particle size distribution can be measured by a laser diffraction type particle size distribution measurement apparatus.

The content of the inorganic particles in adhesive layer 40 can be appropriately set from the viewpoint of heat resistance and electrochemical stability. The content of the inorganic particles in adhesive layer 40 is 15 mass % or more, may be 30 mass % or more, or may be 50 mass % or more, and is 90 mass % or less, may be 85 mass % or less, or may be 75 mass % or less.

(Organic Binder)

The organic binder binds the inorganic particles together. Further, the organic binder binds the substrate of the separator and the adhesive layer together.

The organic binder is not particularly limited, but is preferably an organic binder having excellent heat resistance and electrochemical stability. Examples of the organic binder include polyolefin, a polyvinyl-alcohol-based resin, a fluorine-containing resin, and the like. Examples of the polyolefin include polyethylene, polypropylene, and modified substances thereof. Examples of the polyvinyl-alcohol-based resin include polyvinyl alcohol, polyvinyl acetate, and the like. Examples of the fluorine-containing resin include polyvinylidene difluoride, polytetrafluoroethylene, vinylidene fluoride-hexafluoropropylene copolymer, vinylidene fluoride-hexafluoropropylene-tetrafluoroethylene copolymer, ethylene-tetrafluoroethylene copolymer, and the like.

As the organic binder, polyvinylidene difluoride, vinylidene fluoride-hexafluoropropylene copolymer, and vinylidene fluoride-hexafluoropropylene-tetrafluoroethylene copolymer, which are vinylidene-fluoride-based resins, are preferable from the viewpoint of heat resistance and electrochemical stability. Among them, vinylidene fluoride-hexafluoropropylene copolymer is more preferable.

The molecular weight of the organic binder is not particularly limited, but the mass average molecular weight is preferably 130,000 or more and 500,000 or less. This is due to the following reason: when the molecular weight of the organic binder is 130,000 or more and 500,000 or less, internal short circuit resulting from generation of lithium dendrite can be prevented, and retention of the non-aqueous electrolyte solution becomes high to improve a cycle characteristic.

The content of the organic binder in adhesive layer 40 can be appropriately set from the viewpoint of heat resistance and electrochemical stability. The content of the organic binder in adhesive layer 40 is 10 mass % or more, may be 20 mass % or more, may be 40 mass % or more, and is 85 mass % or less, may be 80 mass % or less, or may be 70 mass % or less.

(Peeling Strength)

A ratio (hereinafter, simply referred to as "A/B ratio") of a peeling strength (A) between separator 30 and adhesive layer 40 to a peeling strength (B) between negative electrode 20 and adhesive layer 40 is more than 0 and 4.0 or less. When the A/B ratio is 4.0 or less, even though separator 30 is shrunk due to an increase in battery temperature, a portion of adhesive layer 40 remains on the surface of negative electrode 20 to suppress direct contact between negative electrode 20 and positive electrode 10, thereby preventing short circuit. The A/B ratio is preferably 3.5 or less, and more preferably 3.0 or less. The A/B ratio may be any value as long as it is more than 0, and may be 0.5 or more, or may be 1 or more.

It should be noted that in the present disclosure, the peeling strength refers to a peeling strength (90° peeling strength) when separator 30 or negative electrode 20 is peeled in a direction perpendicular (90°) to adhesive layer 40. The peeling strength can be measured by a peeling strength measurement instrument.

The peeling strength (A) is 30 N/m or less. When the peeling strength (A) is more than 30 N/m, resistance of separator 30 may be increased, with the result that a battery resistance, particularly a DC resistance, may be increased.

The peeling strength (B) is 15 N/m or less. When the peeling strength (B) is more than 15 N/m, the battery resistance may be increased. The peeling strength (B) is preferably 8.0 N/m or less.

(Non-Aqueous Electrolyte Solution)

The non-aqueous electrolyte solution includes a non-aqueous solvent and a supporting salt. Examples of the non-aqueous electrolyte solution includes a non-aqueous electrolyte solution having a non-aqueous solvent, such as an organic solvent, in which the supporting salt is contained. The non-aqueous solvent may be, for example, ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. One type of solvent may be used solely, or two or more types of solvents may be used in combination.

The supporting salt is dissolved in the non-aqueous solvent. The supporting salt may be, for example, a lithium salt ($LiPF_6$, $LiBF_4$, $LiAsF_6$, $LiClO_4$, $LiCF_3SO_3$, or the like). One type of supporting salt may be used solely, or two or more types of supporting salts may be used in combination. The supporting salt may have a molar concentration of, for example, 0.5 mol/L or more and 2 mol/L or less.

(Method of Producing Non-Aqueous Electrolyte Secondary Battery)

A method of producing the non-aqueous electrolyte secondary battery according to the present embodiment includes: "(A) preparation of the positive electrode"; "(B) preparation of the negative electrode"; "(C) preparation of the separator including the adhesive layer"; and "(D) assembling and heat pressing".

<<(A) Preparation of Positive Electrode>>

The production method includes preparing positive electrode 10 including the positive electrode active material. For example, a slurry including the positive electrode active material may be applied to a surface of positive electrode current collecting foil 11, thereby forming positive electrode composite material 12.

<<(B) Preparation of Negative Electrode>>

The production method includes preparing negative electrode 20 including the negative electrode active material. For example, a slurry including the negative electrode active material may be applied to a surface of negative electrode current collecting foil 21, thereby forming negative electrode composite material 22.

<<(C) Preparation of Separator Including Adhesive Layer>>

The production method includes preparing separator 30 having adhesive layer 40 on its second surface or each of its first surface and second surface. A method of forming adhesive layer 40 on separator 30 is not particularly limited, and may be the following method, for example.

First, a solution is prepared by dissolving the organic binder in a good solvent. Next, the inorganic particles are dissolved in the solution to prepare a slurry. Then, the slurry is applied to the second surface or each of the first surface and the second surface of separator 30, and separator 30 is then immersed in a poor solvent and is dried, with the result that adhesive layer 40 can be formed on separator 30.

Here, the good solvent means a solvent in which the inorganic particles and the organic binder are likely to be dissolved, such as a solvent having a solubility of 1 mass % or more with respect to the inorganic particles and the organic binder at room temperature. Examples of the good solvent include N-methyl-2-pyrrolidone (NMP), N,N-dimethylacetamide, and the like. The poor solvent means a solvent in which the inorganic particles and the organic binder are less likely to be dissolved, such as a solvent having a solubility of less than 1 mass % with respect to the inorganic particles and the organic binder at room temperature. Examples of the poor solvent include water, tripropylene glycol, methanol, and the like. One of these solvents may be used solely or two or more of these solvents may be used in combination.

Further, an application method is not particularly limited, and examples of the application method include a dip coating method, a spray coating method, a roll coating method, a doctor blade method, a gravure coating method, a screen printing method, and the like. It should be noted that when forming adhesive layers 40 on the both surfaces of separator 30, adhesive layers 40 may be formed one after the other on the surfaces, or may be formed simultaneously on the surfaces.

It should be noted that for stability of dispersion and facilitation of application, an additive such as a dispersant, a thickener, or a pH control agent may be added to the slurry to such an extent that the object of the present embodiment is not compromised.

<<(D) Assembling and Heat Pressing>>

The production method includes assembling into the battery including positive electrode 10, negative electrode 20, separator 30 including adhesive layer 40, and the non-aqueous electrolyte solution. For example, electrode assembly 50 can be formed which includes positive electrode 10, separator 30 including adhesive layer 40, and negative electrode 20.

Electrode assembly 50 is accommodated in the exterior package. The electrolyte solution is injected into the exterior package and the exterior package is then sealed.

After the sealing, the exterior package is heat-pressed. The heat pressing is preferably performed at a temperature of 60° C. or more and 80° C. or less. By performing the heat pressing at 60° C. or more and 80° C. or less, adhesion between the electrode and the separator is improved.

A pressure in the heat pressing is not particularly limited, and may be, for example, 0.5 MPa or more and 5 MPa or less. A holding time of the heat pressing is not particularly limited, and may be, for example, 1 minute or more and 10 minutes or less.

EXAMPLES

Hereinafter, the present embodiment will be described with reference to examples, but the present embodiment is not limited thereto.

<Preparation of Separator>

(Separator A)

PE having a thickness of 12 μm was prepared as a separator A. Separator A had a porosity of 40%, and was cut into a shape having a length of 123.5 mm and a width of 103.5 mm.

(Separator B)

Separator A described above and boehmite (D50=0.9 μm) serving as the inorganic particles were prepared. The boehmite, water, and an ammonium polycarboxylate aqueous solution serving as a dispersant were mixed to obtain a dispersion. Water, an ammonium polycarboxylate aqueous solution, and acrylic latex serving as a resin binder were mixed and dispersed in the dispersion to obtain a slurry having the following composition (solid content: 30 mass %).

[Composition]

Inorganic particles: 95.0 mass %

Resin binder: 4.0 mass % (in terms of solid content)

Dispersant: 1.0 mass % (in terms of solid content)

The slurry was applied to one surface (second surface) of separator A and dried at 60° C. to obtain a separator B having a coating layer. The application was performed to provide the coating layer having a thickness of 2 μm.

(Separator C)

Separator A described above, boehmite (D50=0.9 μm) serving as the inorganic particles, and a polyvinylidene difluoride-based resin (PVdF resin) (vinylidene fluoride: hexafluoropropylene=95.5 mol %:4.5 mol %; mass average molecular weight:about 400,000) serving as the organic binder were prepared. The PVdF resin and NMP were mixed to obtain a mixed liquid. The mixed liquid was mixed with boehmite to obtain a slurry having the following composition (solid content: 15 mass %).

[Composition]

Inorganic particles: 85.0 mass %

Organic binder: 15.0 mass % (in terms of solid content)

The slurry was applied to each of the both surfaces (the first surface and the second surface) of separator A, and separator A was then immersed in a congealed liquid (water: N,N-dimethylacetamide:tripropylene glycol=55 mass %:30 mass %: 15 mass %) at 40° C. After the immersion, separator A was pulled up and dried at 60° C. to obtain a separator C having an adhesive layer on each of the both surfaces. The application was performed to provide the adhesive layer having a thickness of 2 μm.

(Separator D)

A separator D was obtained in the same manner as in separator C except that the composition of the slurry was changed to 30.0 mass % of the inorganic particles and 70.0 mass % of the organic binder.

(Separator E)

A separator E was obtained in the same manner as in separator C except that the composition of the slurry was changed to 75.0 mass % of the inorganic particles and 25.0 mass % of the organic binder.

(Separator F)

A separator F was obtained in the same manner as in separator C except that the composition of the slurry was changed to 55.0 mass % of the inorganic particles and 45.0 mass % of the organic binder.

(Separator G)

A separator G was obtained in the same manner as in separator C except that the composition of the slurry was changed to 20.0 mass % of the inorganic particles and 80.0 mass % of the organic binder.

<Production of Non-Aqueous Electrolyte Secondary Battery>

Examples 1 to 11 of the Present Disclosure and Comparative Examples 1 to 17

A slurry was obtained by mixing and dispersing $LiNi_{1/3}Co_{1/3}Mn_{1/3}O_2$ (94 mass %) serving as the positive electrode active material, CB (4 mass %) serving as the conductive material, PVdF (2 mass %) serving as the binder, and NMP serving as the dispersion medium. The slurry was uniformly applied to an Al foil (thickness: 15 μm) serving as the positive electrode current collecting foil, and the Al foil was heated and dried to obtain a sheet for positive electrode. After the drying, the sheet was caused to pass through a roll press, was pressed to attain a predetermined density, and was cut into a shape having a length of 120 mm and a width of 100 mm to produce a positive electrode sheet.

Graphite (96 mass %) serving as the negative electrode active material, SBR (2.5 mass %) and CMC (1.5 mass %) each serving as the binder, and water serving as the dispersion medium were mixed and dispersed to obtain a slurry. The slurry was uniformly applied to a Cu foil (thickness: 10 μm) serving as the negative electrode current collector, and the Cu foil was heated and dried to obtain a sheet for negative electrode. After the drying, the sheet was caused to pass through a roll press, was pressed to attain a predetermined density, and was cut into a shape having a length of 122 mm and a width of 102 mm to produce a negative electrode sheet.

The positive electrode, the separator, and the negative electrode were stacked to separate the positive electrode and the negative electrode from each other by each of the separators shown in Tables 1 and 2. In this way, a stacked type electrode assembly was formed.

A pouch composed of a laminate film was prepared as the exterior package. The electrode assembly was accommodated in the exterior package. As the non-aqueous electrolyte solution, a solution obtained by dissolving the supporting salt ($LiPF_6$) in a mixed solvent (EC:DMC:EMC=30 volume %:40 volume %:30 volume %) at a concentration of 1.1 mol/L was used. The electrolyte solution was injected into the exterior package. After injecting the electrolyte solution, the exterior package was sealed. After the sealing, for examples 1 to 11 of the present disclosure and comparative examples 9 to 17, heat pressing was performed for 120 seconds at the respective temperatures shown in Tables 1 and 2 and at a pressure of 1 MPa. In this way, test batteries of examples 1 to 11 of the present disclosure and comparative examples 1 to 17 were produced.

<Peeling Strength>

(Separator)

A tape (Scotch 600 provided by 3M Japan) having a length of 100 mm and a width of 20 mm was used to adhere each of separators B to G obtained as described above, and a strength when peeling the separator from the adhesive layer at 90° was defined as the peeling strength (A) between the separator and the adhesive layer. The peeling strength (A) was measured at a peeling rate of 50 mm/min using a 90° peeling strength measurement instrument (IP-5N provided by IMADA) under a temperature environment of 25° C. The arithmetic mean of results of three measurements is shown in Tables 1 and 2. It should be noted that for separator B, a strength when peeling the coating layer from the separator at 90° was regarded as the peeling strength (A).

(Negative Electrode)

Each of separators B to G obtained as described above was cut into a shape having a length of 80 mm and a width of 25 mm. The negative electrode obtained as described above was cut into a shape having a length of 70 mm and a width of 20 mm. Each separator and the negative electrode were stacked on each other to form a stack constituted of the separator and the negative electrode. Each stack was accommodated in the above-mentioned exterior package, the above-mentioned non-aqueous electrolyte solution was injected, and the exterior package was sealed. After the sealing, heat pressing was performed at each temperature shown in Tables 1 and 2 at a pressure of 1 MPa for 90 seconds. After the heat pressing, the stack was removed from each exterior package. Then, the stack was placed with the negative electrode being located on the upper side, and was adhered using a tape (Scotch 600 provided by 3M Japan) having a length of 100 mm and a width of 30 mm, and a strength when peeling the negative electrode from the adhesive layer at 90° was defined as the peeling strength (B) between the negative electrode and the adhesive layer. Measurement conditions were the same as those for the peeling strength (A). The arithmetic mean of results of three measurements is shown in Tables 1 and 2.

Evaluation (Activation)

Under a temperature environment of 25° C., each test battery was sandwiched between aluminum plates and was constrained in size with a pressure of 1000 kPa being applied to the test battery in the stacking direction of the layers included in the test battery. Then, each test battery was charged and discharged by a constant current-constant voltage (CC-CV) method with the battery being constrained in size. Conditions are described below. Then, the constraint condition was changed as shown in Tables 1 and 2, thereby obtaining each test battery for below-described evaluations. In the tables, 1000 kPa means a constraint in size, and each of 15 kPa and 5 kPa means a constraint in pressure. It should be noted that "C" is a symbol representing an hour rate of current. A current of 1 C is defined to discharge a designed capacity of the test battery in one hour.

[Conditions]

CC charging: charging current=0.1 C, cut-off voltage=4.25 V

CV charging: 3 hours

CC discharging: discharging current=0.1 C, cut-off voltage=3.0 V (Heating Test)

Under a temperature environment of 25° C., each test battery was sandwiched between aluminum plates and was charged to 3.3 V with a charging capacity of 0.1 C. After the charging, a ribbon heater was wound on the aluminum plates, a heat insulating material was wound therearound, and then thermocouples were attached to the vicinities of tabs of the positive electrode and negative electrode of each test battery. A setting was made to increase the temperature of each test battery at a rate of 5° C./min, and a temperature when the voltage was decreased to 0.5 V was measured. The temperature is shown in Tables 1 and 2 as well as FIG. 2. It is considered that as the temperature is higher, safety is more excellent. It should be noted that the voltage of the test battery is decreased presumably because the separator is shrunk by heating to bring the positive electrode and the negative electrode into contact with each other.

(300 Cycle Test)

Under a temperature environment of 45° C., 300 charging/discharging cycles were performed with regard to each test battery in accordance with the CC method. One cycle represents one cycle of "charging→pause→discharging" as described below. A discharging capacity at the 300th cycle was divided by a discharging capacity at the first cycle, thereby finding a capacity retention. The capacity retention is shown in Tables 1 and 2 below. It is considered that as the capacity retention is higher, cycle endurance is more excellent.

[Conditions]

Charging: charging current=0.3 C, cut-off voltage=4.2 V

Pause: 60 seconds

Discharging: discharging current=0.3 C, cut-off voltage=2.5 V (100 Cycle Test)

Under a temperature environment of 45° C., 100 charging/discharging cycles were performed with regard to each of the test batteries of examples 1 to 11 of the present disclosure in accordance with the CC method. One cycle represents one cycle of "charging→pause→discharging" as described below. A discharging capacity at the 100th cycle was divided by a discharging capacity at the first cycle, thereby finding a capacity retention. The capacity retention is shown in Tables 1 and 2. It is considered that as the capacity retention is higher, cycle endurance is more excellent.

[Conditions]

Charging: charging current=1.0 C, cut-off voltage=4.2 V

Pause: 60 seconds

Discharging: discharging current=1.0 C, cut-off voltage=2.5 V

TABLE 1

| | Separator | Heat Pressing Temperature (° C.) | Peeling Strength (A) (N/m) | Peeling Strength (B) (N/m) | A/B | Constraint Condition (Kpa) | Reached Temperature in Heating Test (° C.) | 0.3 C Capacity Retention (%) | 1.0 C Capacity Retention (%) |
|---|---|---|---|---|---|---|---|---|---|
| Example 1 | C | 70 | 6.0 | 1.5 | 4.0 | 5 | 140 | 83 | 85 |
| Example 2 | | 80 | | 3.1 | 1.9 | | 142 | 88 | 83 |
| Example 3 | D | 70 | 16.9 | 5.5 | 3.1 | | 141 | 91 | 81 |
| Example 4 | | 80 | | 8.2 | 2.1 | | 144 | 93 | 77 |
| Example 5 | E | 60 | 9.3 | 2.4 | 3.9 | | 139 | 82 | 84 |
| Example 6 | | 70 | | 2.8 | 3.3 | | 141 | 87 | 84 |
| Example 7 | | 80 | | 4.0 | 2.3 | | 142 | 90 | 82 |
| Example 8 | F | 70 | 13.1 | 4.4 | 3.0 | | 140 | 92 | 82 |
| Example 9 | | 80 | | 7.0 | 1.9 | | 143 | 93 | 81 |
| Example 10 | G | 70 | 25.5 | 8.0 | 3.2 | | 141 | 92 | 80 |
| Example 11 | | 80 | | 10.5 | 2.4 | | 143 | 92 | 75 |

TABLE 2

| | Separator | Heat Pressing Temperature (° C.) | Peeling Strength (A) (N/m) | Peeling Strength (B) (N/m) | A/B | Constraint Condition (Kpa) | Reached Temperature in Heating Test (° C.) | 0.3 C Capacity Retention (%) |
|---|---|---|---|---|---|---|---|---|
| Comparative Example 1 | A | — | — | — | — | 1000 | 122 | 85 |
| Comparative Example 2 | | | | | | 15 | 127 | 79 |
| Comparative Example 3 | | | | | | 5 | 128 | 73 |
| Comparative Example 4 | B | | 7.2 | 0 | 0 | 1000 | 144 | 86 |
| Comparative Example 5 | | | | | | 15 | 145 | 80 |
| Comparative Example 6 | | | | | | 5 | 145 | 75 |
| Comparative Example 7 | C | | 6.0 | | | 1000 | 125 | 83 |
| Comparative Example 8 | | | | | | 5 | 128 | 72 |
| Comparative Example 9 | | 50 | | 0.7 | 8.6 | | 128 | 76 |
| Comparative Example 10 | | 60 | | 1.1 | 5.5 | | 130 | 79 |
| Comparative Example 11 | D | 50 | 16.9 | 2.3 | 7.3 | | 130 | 81 |
| Comparative Example 12 | | 60 | | 4.1 | 4.1 | | 132 | 88 |
| Comparative Example 13 | E | 50 | 9.3 | 1.1 | 8.5 | | 131 | 80 |
| Comparative Example 14 | F | 50 | 13.1 | 1.8 | 7.3 | | 132 | 80 |
| Comparative Example 15 | | 60 | | 3.2 | 4.1 | | 133 | 84 |
| Comparative Example 16 | G | 50 | 25.5 | 3.4 | 7.5 | | 129 | 87 |
| Comparative Example 17 | | 60 | | 5.1 | 5.0 | | 132 | 91 |

Results

EXAMPLES OF THE PRESENT DISCLOSURE

Figure 2:
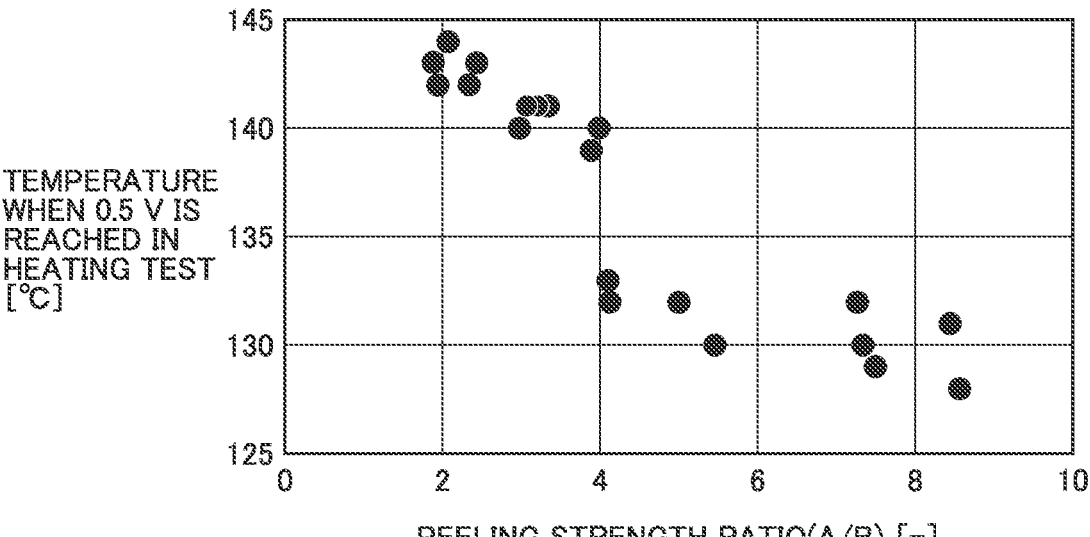
FIG. 2 is a graph showing a relation between a battery temperature when 0.5 V is reached and a ratio of a peeling strength between a separator and an adhesive layer to a peeling strength between a negative electrode and the adhesive layer in a heating test on a non-aqueous electrolyte secondary battery in each of examples of the present embodiment and comparative examples.

FIG. 2 is a graph showing a relation between a battery temperature when 0.5 V is reached in the heating test and the A/B ratio. With the A/B ratio of 4.0 or less, the battery temperature when 0.5 V is reached is significantly increased, and with a smaller A/B ratio, the temperature is further increased. This is presumably due to the following reason: even when the separator is shrunk in the heating test, a portion of the adhesive layer is likely to remain on the negative electrode, with the result that the battery tempera-ture when 0.5 V is reached becomes high. Further, it is considered that since adhesive force between the negative electrode and the adhesive layer is strong, the capacity retention after the cycle test is also increased and both the battery characteristics and the safety are achieved.

COMPARATIVE EXAMPLES

In each of comparative examples 1 to 3, since no adhesive layer is present, the capacity retention is decreased when the constraint condition is set to a low pressure. Moreover, since no coating layer is present, the battery temperature when 0.5 V is reached in the heating test is also low.

In each of comparative examples 4 to 6, since the coating layer is present, the battery temperature when 0.5 V is reached in the heating test is high. On the other hand, since no adhesive layer is present, the capacity retention is decreased when the constraint condition is set to a low pressure.

In each of comparative examples 7 and 8, since the adhesive layer is present but no heat pressing has been performed, the capacity retention is decreased when the constraint condition is set to a low pressure. Similarly, the battery temperature when 0.5 V is reached in the heating test is also low.

In each of comparative examples 9 and 10, since heat pressing is performed, the capacity retention is increased as compared with comparative example 8, but cannot be said to be sufficient. Further, since the A/B ratio is high, the battery temperature when 0.5 V is reached in the heating test is also low.

In each of comparative examples 11 to 17, since adhesive force between the negative electrode and the adhesive layer is strong, the capacity retention after the cycle test is increased. On the other hand, since the A/B ratio is high, the battery temperature when 0.5 V is reached in the heating test is low.

Although the embodiments of the present disclosure have been described and illustrated in detail, it is clearly understood that the same is by way of illustration and example only and is not to be taken by way of limitation, the scope of the present invention being interpreted by the terms of the appended claims. The scope of the present disclosure is defined by the terms of the claims, and is intended to include any modifications within the scope and meaning equivalent to the terms of the claims.

What is claimed is:

1. A non-aqueous electrolyte secondary battery comprising a positive electrode, a negative electrode, a separator, and a non-aqueous electrolyte, wherein the separator includes a first surface facing the positive electrode and a second surface facing the negative electrode, an adhesive layer is formed on the second surface or each of the first surface and the second surface, the adhesive layer includes inorganic particles and an organic binder, and a ratio of a peeling strength between the separator and the adhesive layer to a peeling strength between the negative electrode and the adhesive layer is 2.3 or more and 4.0 or less.

2. The non-aqueous electrolyte secondary battery according to claim 1, wherein the peeling strength between the negative electrode and the adhesive layer is 8.0 N/m or less.

3. The non-aqueous electrolyte secondary battery according to claim 2, wherein the peeling strength between the separator and the adhesive layer is 30 N/m or less.

4. The non-aqueous electrolyte secondary battery according to claim 1, wherein the peeling strength is a peeling strength when the separator or the negative electrode is peeled in a direction perpendicular (90°) to the adhesive layer.

* * * * *